United States Patent [19]

Yesel et al.

[11] Patent Number: 5,474,147
[45] Date of Patent: Dec. 12, 1995

[54] SLIP CONTROL IN A MACHINE FOR MATCHING HYDRAULIC PUMP FLUID FLOW TO PUMP DRIVEN SUPPLEMENTARY FRONT WHEEL DRIVE MOTOR FLUID FLOW

[75] Inventors: Leon P. Yesel, East Peoria; John P. Kitzerow, Metamora, both of Ill.

[73] Assignee: Caterpillar Inc., Peoria, Ill.

[21] Appl. No.: 276,081

[22] Filed: Jul. 15, 1994

[51] Int. Cl.⁶ .................................................. B60K 17/356
[52] U.S. Cl. ...................... 180/197; 364/424.07; 180/243
[58] Field of Search ....................... 364/424.07; 180/23, 180/197, 242, 243, 252; 60/452

[56] References Cited

U.S. PATENT DOCUMENTS

| | | | |
|---|---|---|---|
| 4,236,595 | 12/1980 | Beck et al. | 180/243 |
| 4,396,087 | 8/1983 | Rock et al. | 180/243 |
| 5,147,010 | 9/1992 | Olson et al. | 180/243 |
| 5,190,111 | 3/1993 | Young et al. | 364/424.07 X |

*Primary Examiner*—Margaret A. Focarino
*Assistant Examiner*—Victor E. Johnson
*Attorney, Agent, or Firm*—John L. James

[57] ABSTRACT

A method is provided for controlling hop in an all wheel drive machine having a torque control lever and a pump for supplying pressurized fluid to wheel motors for effecting all wheel drive. The method includes monitoring machine speed and motor pressure, sensing a first motor pressure fluctuation and subsequent motor pressure fluctuations indicative of a hop, determining desired pump pressure based upon machine speed, and overriding the torque control lever and holding pump pressure constant at desired pump pressure for a preselected time in response to detecting a predetermined number of hops occurring at a predetermined frequency.

20 Claims, 9 Drawing Sheets

SLIP CONTROL IN A MACHINE FOR MATCHING HYDRAULIC PUMP FLUID FLOW TO PUMP DRIVEN SUPPLEMENTARY FRONT WHEEL DRIVE MOTOR FLUID FLOW

TECHNICAL FIELD

The present invention pertains to an all wheel drive machine, and, more particularly, to a method for controlling hopping of the front wheels wherein hopping is a form of wheel slip caused by a mismatch of fluid flow from a supply pump to the pump driven front wheels that can cause the front wheels to lose physical contact with the ground.

BACKGROUND OF THE INVENTION

Earth moving equipment, such as a motor grader for example, often must operate in environments with poor footing conditions. Some earth moving machines are equipped with an all wheel drive system so that the front wheels of the machine, normally used for steering, are driven to help propel the machine in these poor footing conditions. Normally, only the rear wheels are driven, but when poor footing conditions are encountered causing excessive wheel slip, the front wheels of an all wheel drive machine can be driven to increase traction of the machine thereby reducing slip and maintaining directional control. When all wheels are in poor footing conditions, such as working on side slopes, or maximum traction is desired, the machine can be operated in an all wheel drive mode. Operating a motor grader in an all wheel drive mode for maximum traction may be desirable when the motor grader is performing a cutting operation, such as cutting a new road or grading on a side slope. The all wheel drive mode is also useful when a motor grader is used for removing snow from a roadway.

On a motor grader, a hydraulic pump is used to supply pressurized fluid to pump motors which drive the front wheels in the forward and reverse directions. A torque control lever is used in the all wheel drive mode to control the pressure and therefore the rim pull delivered to the front wheels.

When operating in the all wheel drive mode, the traction conditions can result in the front wheels actually hopping off the ground. These traction conditions can occur when operating in snow, sand, or firm underfoot conditions with a thin layer of loose material on top. This hopping condition causes loss of traction and in excess of twice the front axle weight upon impact. Hopping can occur when applying large amounts of torque to the from wheels and the front wheels encounter the poor traction conditions causing the front wheels to alternately spin and stick. It can be appreciated that it would be highly desirable to operate in an all wheel drive mode without fear of excessive hopping. In some instances, an operator may intentionally cause pressure fluctuations which alternately cause the wheels to stick and spin somewhat. Such operation is useful under certain conditions. It is desirable that the operator be able to cause or continue the pressure fluctuations to accomplish a given task.

DISCLOSURE OF THE INVENTION

The present invention is directed to overcoming one or more of the problems set forth above. Briefly summarized, according to one aspect of the present invention, a method for controlling hop in an all wheel drive machine having a torque control lever and a pump for supplying pressurized fluid to wheel motors for effecting all wheel drive comprises monitoring machine speed and motor pressure, sensing a first motor pressure fluctuation and subsequent motor pressure fluctuations indicative of a hop, determining desired pump pressure based upon machine speed, and overriding the torque control lever and holding pump pressure constant at desired pump pressure for a preselected time in response to detecting a predetermined number of hops occurring at a predetermined frequency.

Normally, the pump will supply fluid based upon the aggressiveness of the torque control lever which may not always match the current wheel speed. With the present invention, the aggressiveness of the torque control lever is disregarded to match the front wheel fluid flow, as the wheels are turning, to the flow the pump is generating without regard to the aggressiveness of the torque control lever. When the flows match, there is no hop.

These and other aspects, objects, features and advantages of the present invention will be more clearly understood and appreciated from a review of the following detailed description of the preferred embodiments and appended claims, and by reference to the accompanying drawings.

BEST MODE FOR CARRYING OUT THE INVENTION

Figure 1:
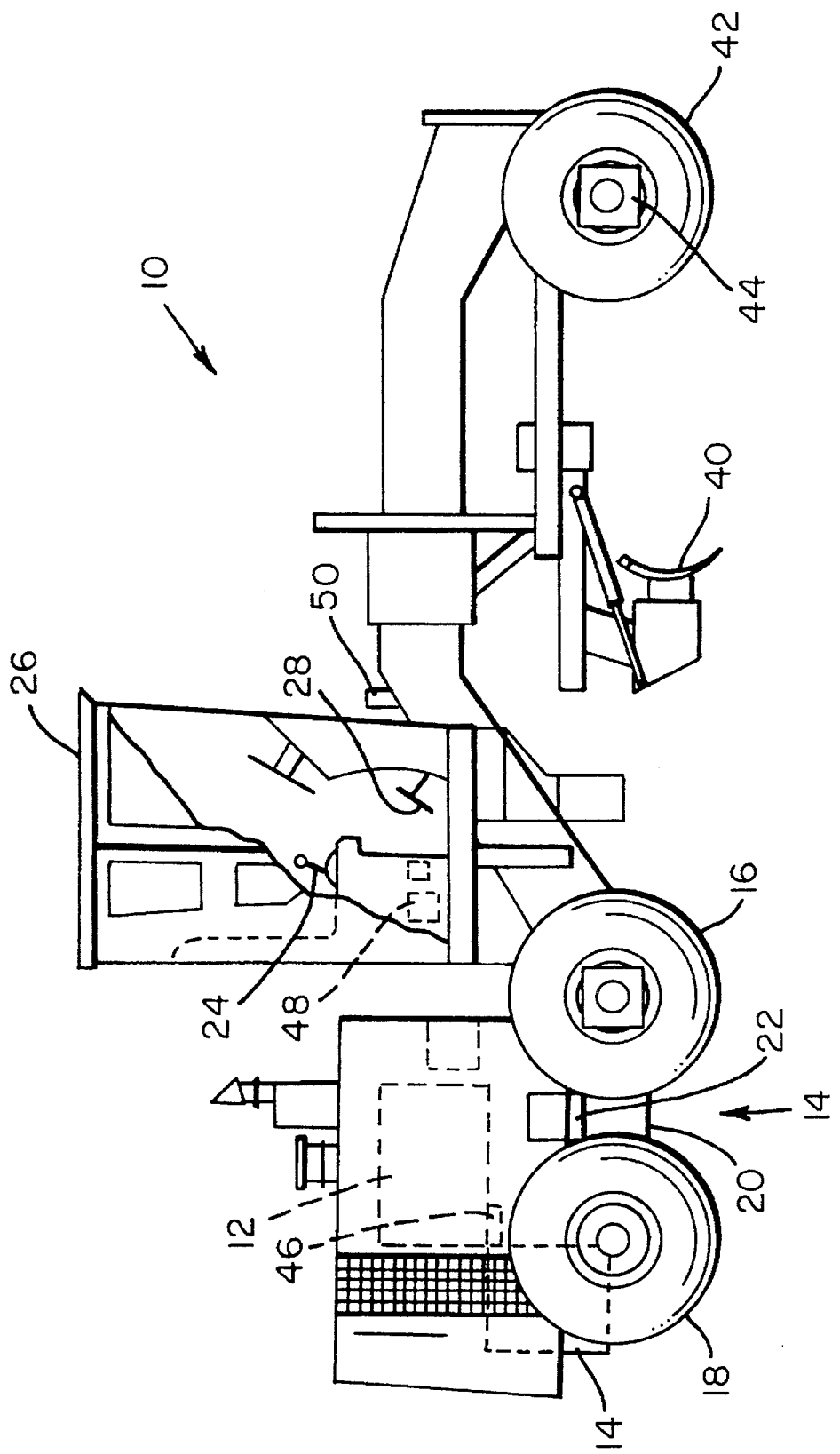
FIG. 1 is a diagrammatic side elevational view of a preferred embodiment of a motor grader constructed for operation in accordance with the present invention.
Figure 2:
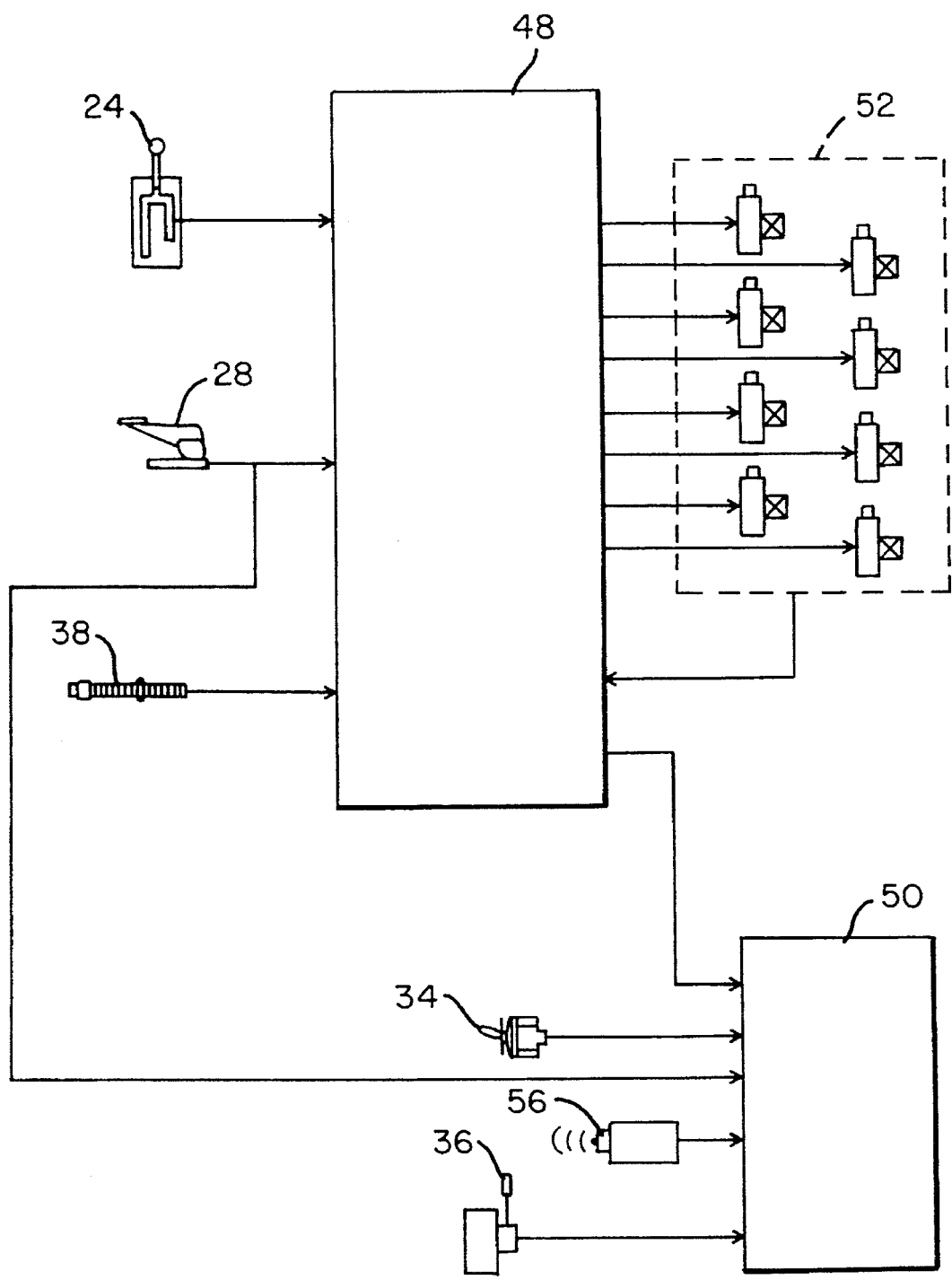
FIG. 2 is a schematic block diagram of the transmission controller of the motor grader of FIG. 1 showing inputs and outputs.

Referring to FIGS. 1 and 2, a motor grader 10 has an engine 12 driving a main drive 14. The main drive 14 includes tandem amounted rear wheels 16, 18 driven by the engine 12 through an electronically controlled and hydraulically actuated transmission 20, and a rear differential 22. The transmission 20 is responsive to a gear shift lever 24 located in an operator's compartment 26 along with an all wheel drive switch 34, and a torque control lever 36. The transmission is preferably a countershaft transmission with an output shaft whose rotation is sensed by a transmission output shaft (TOS) sensor 38. The motor grader blade 40 is attached to the frame of the motor grader 10 between the rear wheels 16 and front wheels 42. In the all wheel drive mode of operation, the front wheels 42 are supplementing drive wheels that are, driven by wheel motors 44 that receive pressurized fluid from a hydraulic pump 46. Electronic transmission controls 48 are located in the cab 26 under the operator's seat and an electronic all wheel drive controller 50 is in front of the operator's cab.

The transmission controller 48 receives inputs from the transmission shift lever 24, the inching pedal 28 and the TOS sensor 38. The controller 48 provides outputs to the all wheel drive controller 50 and the transmission solenoids 52 which operate the hydraulic control module 54 to shift the transmission through its eight forward and six reverse gears. The transmission solenoids 52, control the transmission clutches and determine the actual gear in which the transmission operates. Another output from the transmission controller 48 is an input to the all wheel drive controller 50. Other inputs to the all wheel drive controller 50 include an input from the all wheel drive switch 34, the torque control lever 36, and a motor grader ground speed sensor, such as radar ground speed sensor 56. While other methods of determining machine speed may be used, the radar is preferred because it gives an indication of ground speed that is independent of the wheels and therefore is not as susceptible to errors caused by wheel slip.

Figure 3:
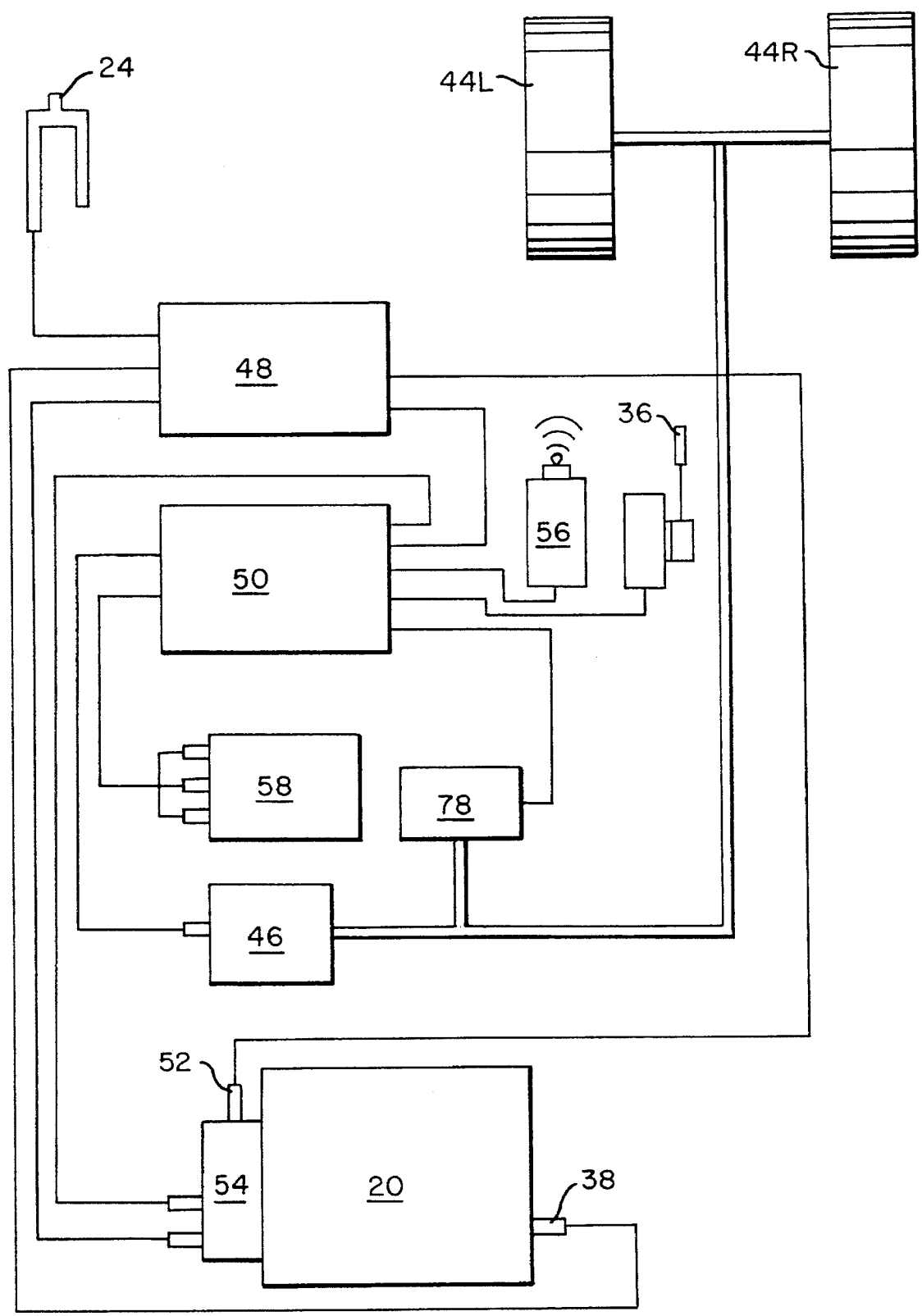
FIG. 3 is a schematic block diagram of the transmission controller and all wheel drive controller of the motor grader of FIG. 1.
Figure 4:
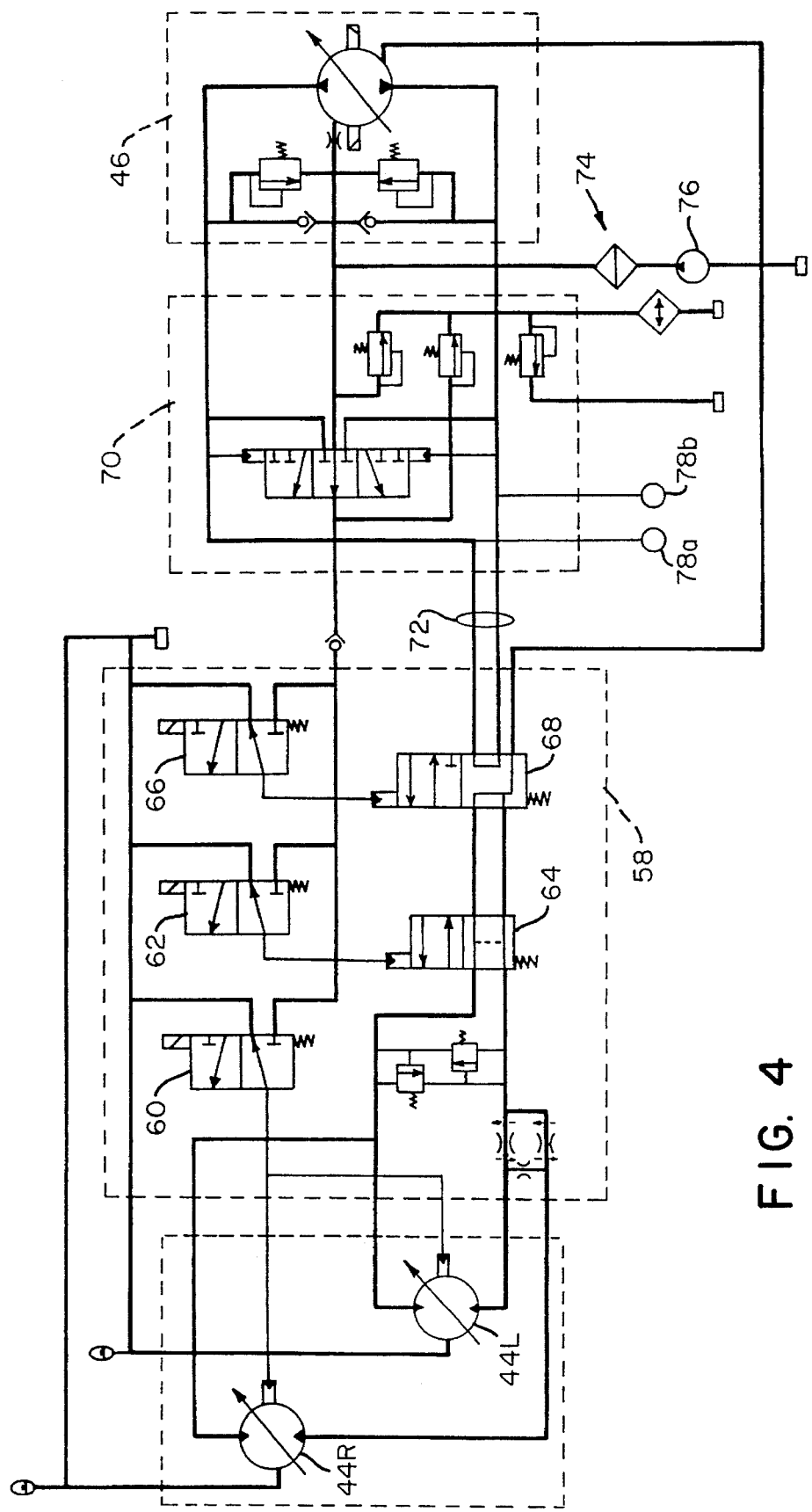
FIG. 4 is a schematic diagram of the hydraulic circuit for the all wheel drive motors of the motor grader of FIG. 1.

Referring now to FIGS. 3 and 4, a control valve 58 is preferably located on the motor grader frame directly above the front axle. The control valve 58 contains a displacement solenoid 60 which controls spool shifting for motor displacement, a freewheel solenoid 62 which controls a freewheel spool 64 for freewheel mode activation, and a charge solenoid 66 which controls a charge spool 68 for charge circuit engagement. The all wheel drive hydraulic system schematic of FIG. 4 shows the wheel motors 44L, 44R, control valve 58, flushing valve 70 and pump 46 that are the primary mechanical system components. Located directly in front of the cab 26 is the flushing valve 70. Its function is to maintain system charge pressure and connect the low pressure side of the drive loop 72, which is determined by the direction of travel, to the charge circuit 74. The charge pump 76 is located under the cab 26 of the motor grader 10 and is preferably mounted on the hydraulic implement pump. It supplies system charge flow and any additional makeup flow required in the drive loop of the all wheel drive system. The all wheel drive system preferably shares the same hydraulic reservoir as the implements.

A convenient location for the pump 46 is on the left-hand side of the motor grader between the differential case and the transmission. The pump is driven off the transmission and supplies the flow requirements to drive the front wheel motors 46. Pressure sensors 78A, 78B are used to monitor pressure in the drive loop 72. When the pump 46 supplies fluid to drive the wheel motors 44 in a forward direction to propel the motor grader in the forward direction, pressure sensor 78A is the high pressure sensor while sensor 78B is the low pressure sensor. Conversely, when pump 46 operates to drive the motor grader in the reverse direction, then pressure sensor 78B is the high pressure sensor while sensor 78A is the low pressure sensor.

Figure 5:
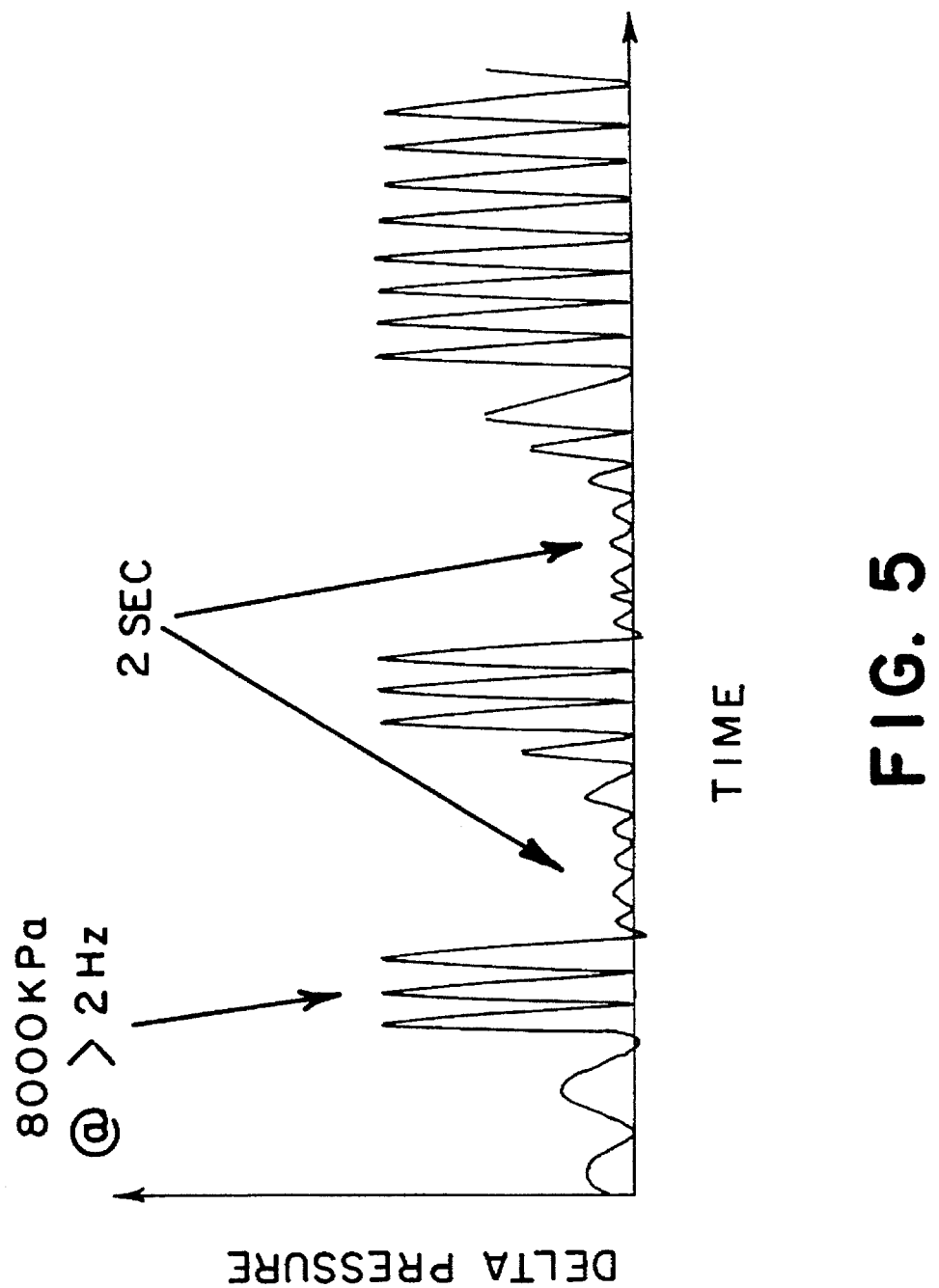
FIG. 5 is a graph illustrating the relationship between pressure fluctuations shown on the vertical axis versus time on the horizontal axis.
Figure 6A:
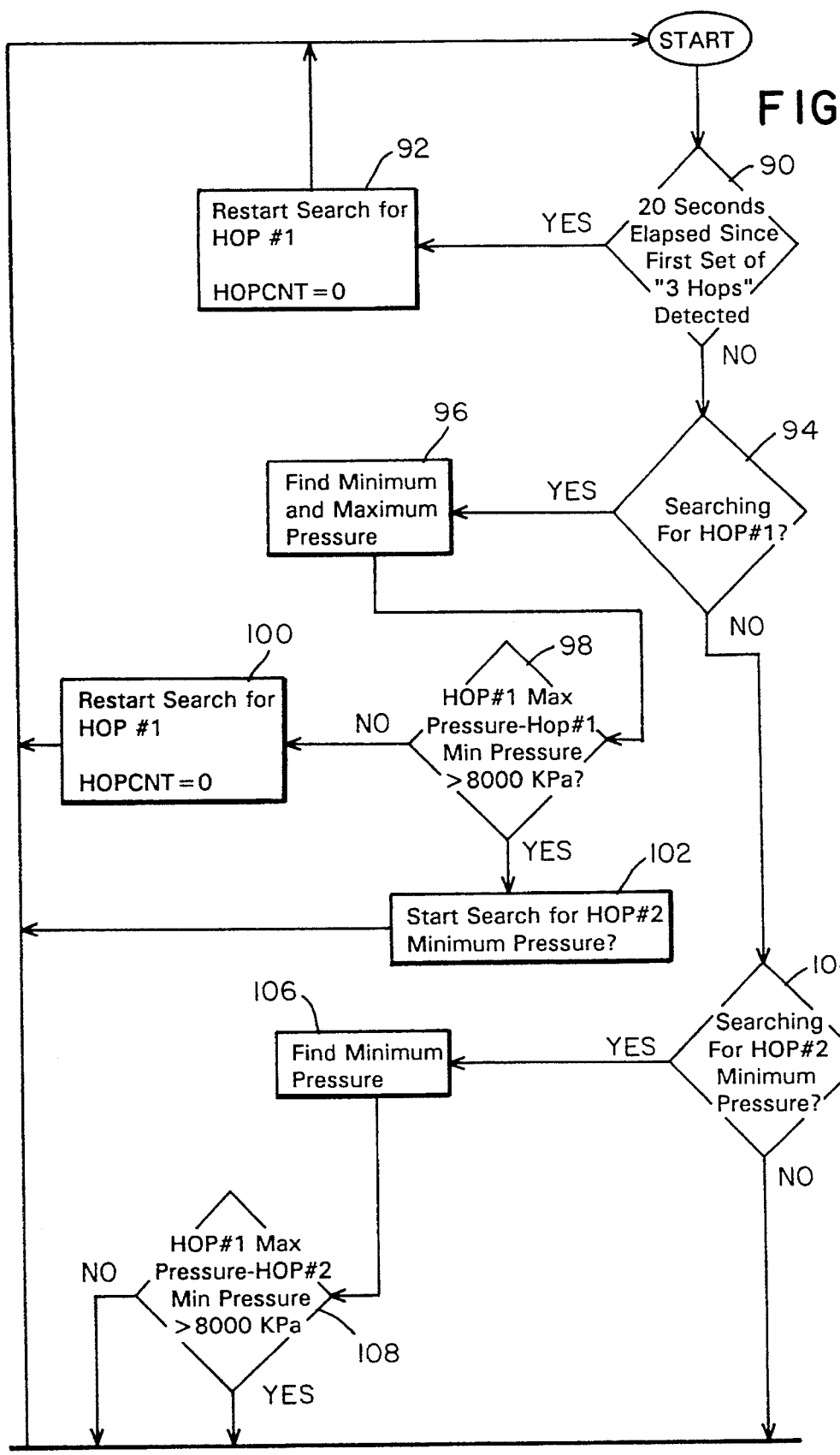
FIGS. 6A–6D are a flow chart illustrating an antihop method for an all wheel drive machine.
Figure 6B:
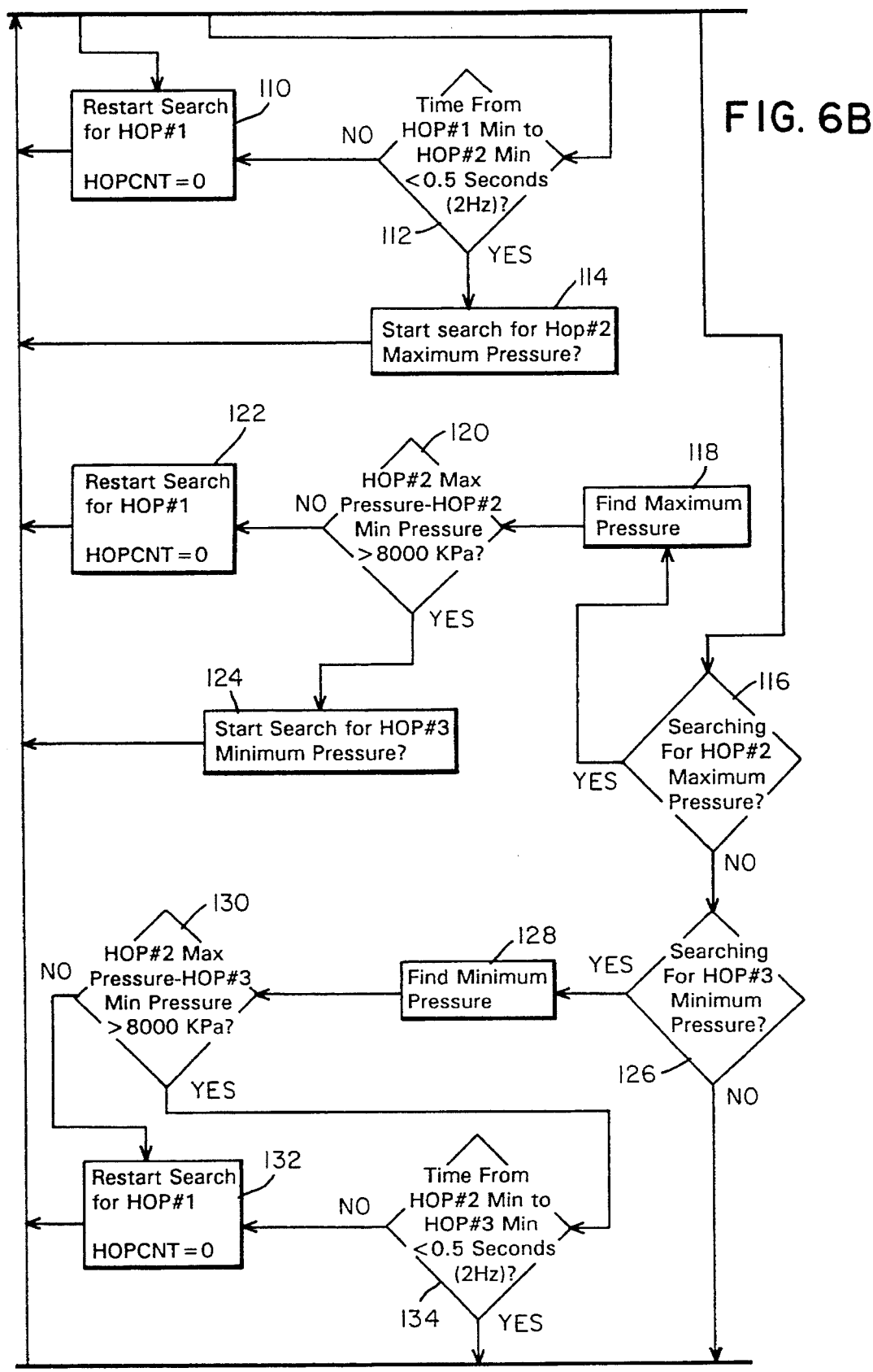
Figure 6C:
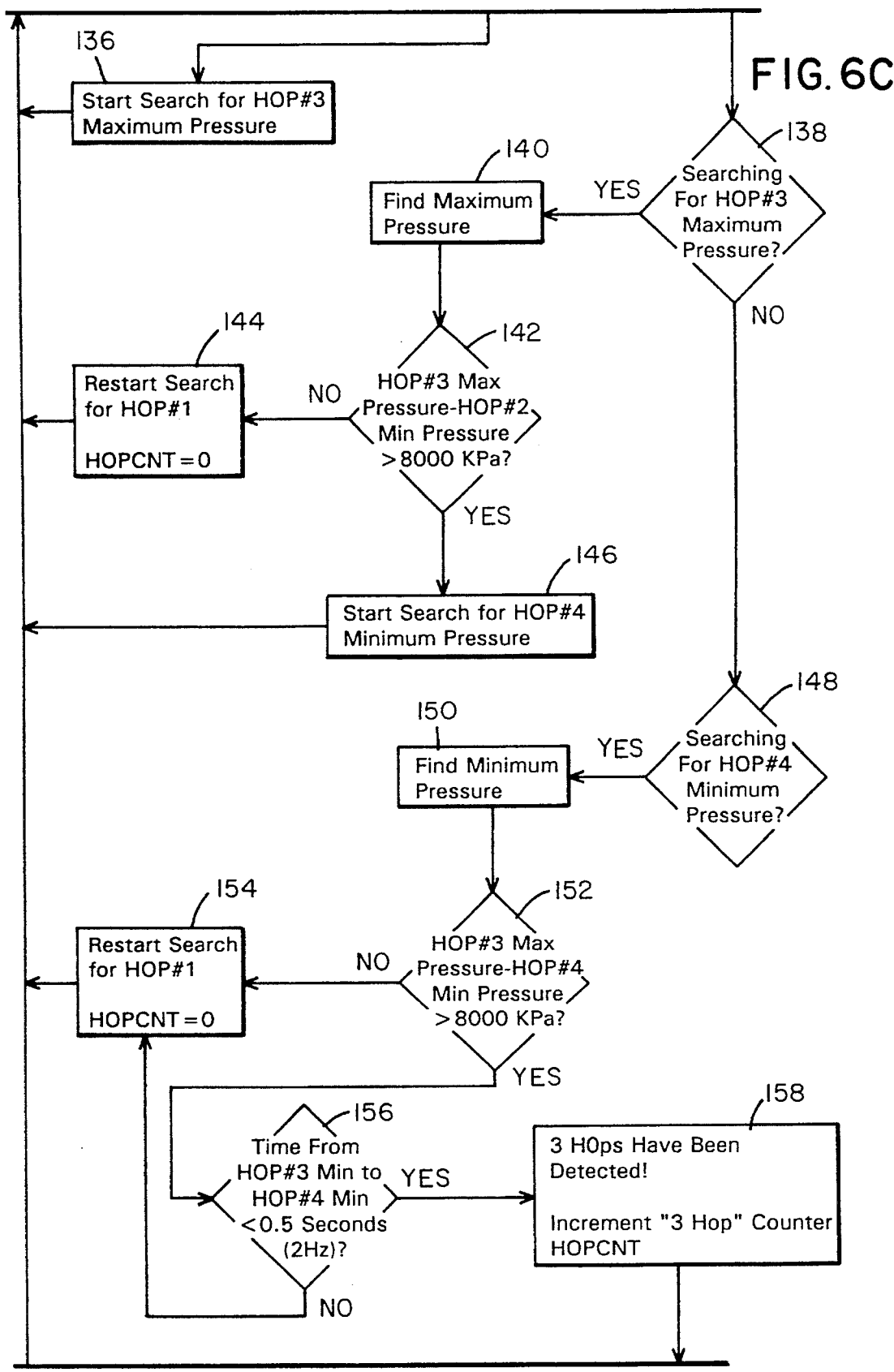
Figure 6D:
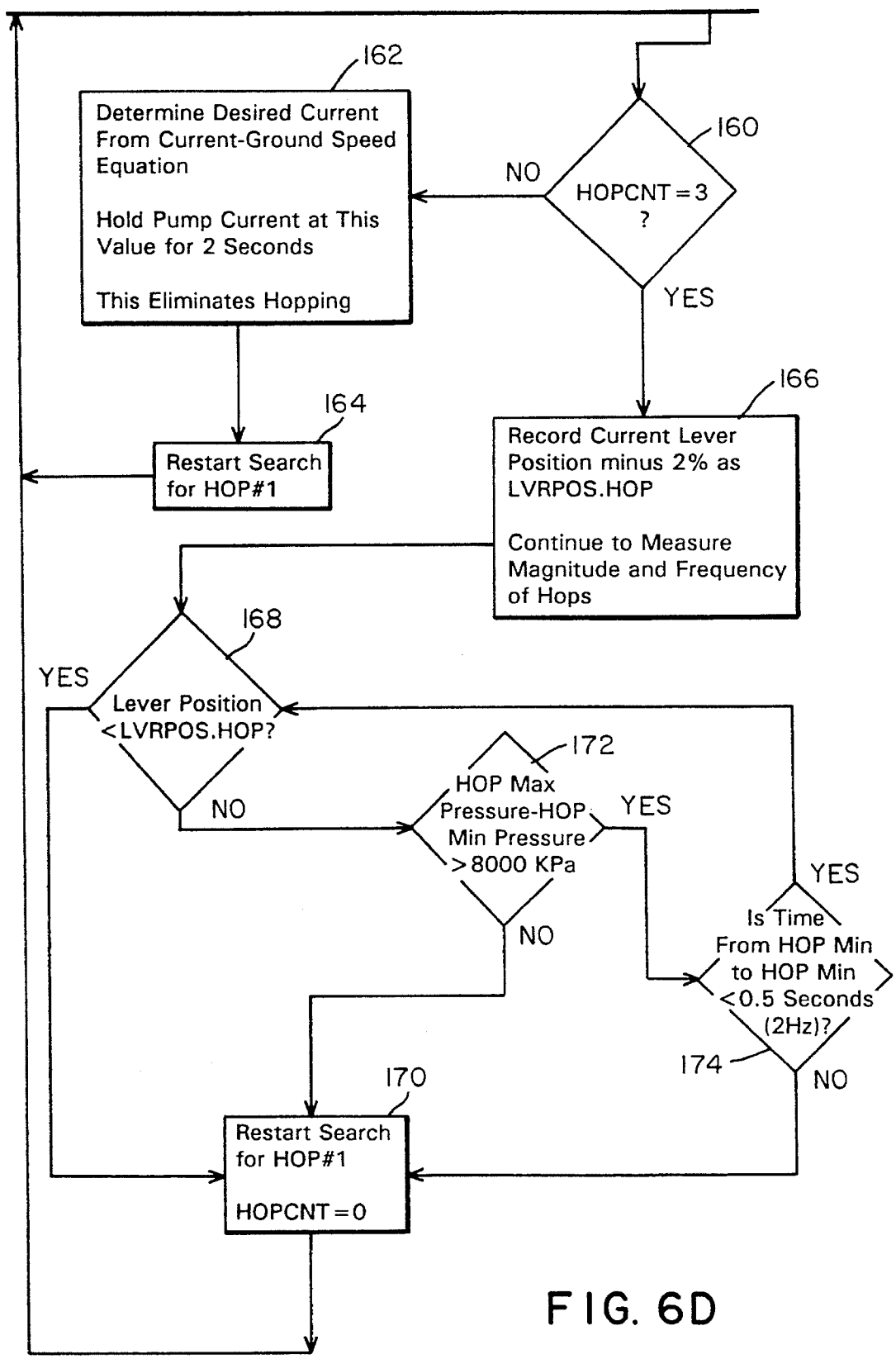

As mentioned, the all wheel drive machine is subject to pressure fluctuations which may sometimes cause the front wheels to hop and create extra load on the front axle when ground contact is regained. By pressure fluctuations it is meant fluctuations or changes in the wheel motors that will occur when the front wheels lose traction or when front wheel torque increases in response to movement of the torque control lever. Each pressure fluctuation is characterized by a minimum pressure and a maximum pressure occurring with a frequency inversely proportional to the time between the minimum and maximum pressures. By hop is meant a difference between minimum pressure and maximum pressure of at least 8,000 kPa and a frequency greater than 1 Hertz. FIG. 5 is a graph showing the relationship between pressure fluctuations shown on the vertical axis versus time on the horizontal axis. Pressure differentials, the difference between maximum pressure and minimum pressure, greater than 8,000 kPa with a frequency of greater than 1 Hertz are considered as a hop. It has been experimentally determined that pressure differentials of this magnitude occurring with such a frequency pose a condition which may require attention. Pressure differentials of this magnitude are not always a problem, they may be intentionally caused by the operator. For example, when plowing snow, an operator may encounter ice or compacted snow which requires extra effort to plow. The operator increases the aggressiveness of the torque control lever to increase pump pressure and wheel torque. By aggressiveness it is meant the position of the lever to increase torque. Thus, increasing aggressiveness of the lever will increase pump pressure and wheel torque while decreasing aggressiveness of the lever will decrease pump pressure and wheel torque. Thus, pressure differentials constituting a hop may be induced by an operator to accomplish certain tasks. During hop, the pump pressure is held constant by holding pump current constant. If three hop sets are not detected within 20 seconds, the three hop counter will be reset to zero. If, on the third hop set, the hop stops as a result of changing traction conditions, the three hop counter will be reset. If, on the third hop set, the operator pulls the torque control lever back more than 2% of the total lever travel, then three hop counter is reset.

The anti-hop logic for an all wheel drive machine is illustrated in the flowchart of FIGS. 6A–6D. The method depicted by the flowcharts starts with a query at block 90 as to whether 20 seconds has elapsed since the first set of three hops was detected. If the answer is yes, then the search is restarted to hop 1 and the counter, HOPCNT, is set to zero. If 20 seconds has not elapsed since the first set of three hops was detected, then, at decision block 94, it is determined whether the all wheel drive controller is searching for hop 1. If so, then at block 96, hop 1 minimum pressure and hop 1 maximum pressure are determined. At block 98, hop 1 maximum pressure and hop 1 minimum pressure are compared. When hop 1 maximum pressure minus hop 1 minimum pressure is not greater than 8,000 kPa, then at block 100, the search for hop 1 is restarted and HOPCNT is reset to zero. If, on the other hand, hop 1 maximum pressure minus hop 1 minimum pressure is greater than 8,000 kPa, then at block 102, hop 1 is confirmed and a search is started for hop 2 minimum pressure and the process restarts. In the process, after finding hop 1, the answer to the query whether the all wheel drive controller is searching for hop 1 at block 94 is no. After a no answer at block 94, the controller queries at block 104 whether it is searching for hop 2 minimum pressure. When the answer is yes, minimum pressure is determined at block 106 and a query is made at block 108 whether hop 1 maximum pressure minus hop 2 minimum pressure is greater than 8,000 kPa. If not, then at block 110, the search is restarted for hop 1 and HOPCNT is set to zero. If the difference between hop 1 maximum pressure and hop 2 minimum pressure is greater than 8,000 kPa, then at block 112, an inquiry is made regarding the time from hop 1 minimum pressure to hop 2 minimum pressure. If the time from hop 1 minimum pressure to hop 2 minimum pressure is not less than 0.5 seconds, the process continues to block 110 where the search for hop 1 is restarted. A time of 0.5 seconds would correspond to a frequency of 2 Hertz. Therefore, if the frequency at block 112 is not greater than 2 Hertz, the search for hop 1 is restarted. If, at block 112, the frequency is greater than 2 Hertz, indicating that the time is less than 0.5 seconds from hop 1 minimum to hop 2 minimum, then at block 114 the search for hop 2 maximum pressure is initiated, and this time, the process progresses to decision block 116.

At decision block 116, the query is made whether the controller is searching for hop 2 maximum pressure. If the answer is yes, maximum pressure is determined at block 118 and a query is made at block 120 as to whether hop 2 maximum pressure minus hop 2 minimum pressure is greater than 8,000 kPa. If not, then at block 122, the search for hop 1 is restarted and HOPCNT is reset to zero. If the hop 2 maximum pressure is more than 8,000 kPa greater than hop 2 minimum pressure, then, at block 124, the controller starts a search for hop 3 minimum pressure.

Because it has now been determined that 20 seconds has not elapsed since the first set of three hops was detected, hop 1 has been located and is no longer searched for, and hop 2 has been located by finding hop 2 minimum pressure and hop 2 maximum pressure, hop 3 is now searched for at decision block 126. At block 128 the minimum pressure is found and the query is made at decision block 130 as to whether hop 2 maximum pressure minus hop 3 minimum pressure exceeds 8,000 kPa. If not, then at block 132 the search is restarted for hop 1 and HOPCNT is set to zero. When hop 2 maximum pressure exceeds hop 3 minimum pressure by more than 3,000 kPa, then at block 134, the time or frequency is determined. If the frequency is not greater than 2 Hertz, the process continues to block 132 where the search for hop 1 is restarted. If on the other hand, the frequency at block 134 is determined to be greater than 2 Hertz then at block 136, the search for hop 3 maximum pressure is begun and the process continues and progresses to decision block 138.

At decision block 138, 2 hops occurring within a given time period at a minimum frequency have been detected, as well as minimum pressure for a third hop. The controller is now searching for hop 3 maximum pressure and finds the maximum pressure at block 140 before inquiring at block 142 whether hop 3 maximum pressure is greater than hop 2 minimum pressure by more than 8,000 kPa. If the answer to the inquiry at block 142 is no, then at block 144, the search for hop 1 is restarted and HOPCNT is reset to zero. If, on the other hand, the answer to the query at block 142 is yes, then at block 146 it is known that the third hop has been located and a search is started for hop 4 minimum pressure. Because three hops have now been detected, the method proceeds to step 148 where a query is made whether a search has been performed for hop 4 minimum pressure. After hop 4 minimum pressure is found at block 150, a query is made at block 152 whether hop 3 maximum pressure exceeds hop 4 minimum pressure by more than 8,000 kPa. If the answer is no, then at block 154 the search is restarted for hop 1 and HOPCNT is reset to zero. When hop 3 maximum pressure exceeds hop 4 minimum pressure by more than 8,000 kPa, then at block 156 a query is made about the frequency. If the frequency from the occurrence of hop 3 minimum pressure to hop 4 minimum pressure is less than 2 Hertz, then the method proceeds to step 154 where the search for hop 1 is restarted. If the frequency is greater than 2 Hertz, then at block 158 it is noted that three hops have been detected by incrementing a three-hop counter, HOPCNT.

Once a set of three hops has been detected at block 158 and the three-hop counter, HOPCNT, is incremented, it is determined at decision block 160 whether or not HOPCNT is equal to three. If not, then at block 162, the controller determines desired pump current from the pump current-ground speed equation, holds the pump current, and therefore pump pressure, at this value for 2 seconds to eliminate hopping and at block 164 restarts the search for hop 1.

When HOPCNT equals three at block 160, this means that three sets of three hops have been detected, and at block 166, the current torque control lever position minus 2% is recorded as LVRPOSHOP. And the controller continues to measure the magnitude and frequency of hops.

Next at decision block 168 it is determined whether the torque control lever position is less than LVRPOSHOP. If so, then at block 170, the search is restarted for hop 1 and HOPCNT is reset to zero. This means that the lever position is less than the current lever position minus 2% recorded earlier and does not need to be reset to control hop.

At block 168, if the lever position is not less than LVRPOSHOP then at block 172, it is determined whether the hop maximum pressure minus the hop minimum pressure is greater than 8,000 kPa. If not, then the method proceeds to block 170 where the search for hop 1 is restarted. If so, the method proceeds to block 174 where the frequency is determined. If the frequency is not greater than 2 Hertz, then the search for hop 1 is restarted at block 170. If the frequency is greater than 2 Hertz, then the method proceeds to the query of block 168 to determine the lever position relative to the recorded current lever position minus 2%.

A slip control apparatus and method has been presented for a machine, such as a motor grader, that has a pump for supplying pressurized fluid to first and second supplementary front wheel drive motors for effecting all wheel drive and has a torque control lever movable between positions of minimum and maximum lever travel for controlling pump pressure with the torque lever position expressed as a percentage of maximum lever travel. The slip control seeks to match hydraulic pump fluid flow to pump driven supplementary front wheel drive motor fluid flow. When the flows match, there is no front wheel slip and there are no pressure fluctuations to cause front wheel hop. The method for controlling slip includes monitoring ground speed of the machine, monitoring motor pressure, and searching for a first set of n hops, where n is an integer greater than 1 and a hop is a fluctuation in wheel motor pressure characterized by a difference between a minimum pressure and a maximum pressure of at least a predetermined amount occurring within a predetermined cycle time. A hop thus has a pressure magnitude and a frequency. The method includes determining whether a predetermined time has elapsed since the first set of n hops was detected and restarting the search for hop 1 if the predetermined time has elapsed since the first set of n hops was detected and resetting a hop counter, or searching for hop 1, if the predetermined time has not elapsed since the first set of n hops was detected, by locating a hop 1 minimum pressure and a hop 1 maximum pressure exceeding the minimum pressure by more than the predetermined amount. The next step is restarting the search for hop 1 if hop 1 maximum pressure does not exceed hop 1 minimum pressure by more than the predetermined amount, and resetting the hop counter.

After locating hop 1, the method also includes searching for subsequent hops, including hop (n−1), hop (n) and hop (n+1) minimum pressure, when the predetermined time has not elapsed since the first set of n hops was detected, and incrementing the hop counter, when hop (n) maximum pressure exceeds hop (n+1) minimum pressure by more than the predetermined amount and hop (n) minimum pressure and hop (n+1) minimum pressure occur at a predetermined frequency.

After incrementing the hop counter, when the hop counter counts less than 3 sets of hops, the next step is determining a desired pump pressure based upon machine ground speed and overriding the torque control lever to hold the pump pressure constant at the desired pump pressure for a preselected time before resuming searching for a first hop. Holding the pump pressure constant will eliminate hopping if the preselected time is sufficiently long.

After incrementing the hop counter, when the hop counter counts 3 sets of hops, the current torque control lever position, expressed as a percentage of torque control lever travel, minus a predetermined amount, is recorded as a modified torque lever position, and the search for hops continues by resuming searching for hop 1.

The search is resumed and the hop counter is reset when the actual torque control lever position is less than the modified torque lever position, when the actual torque control lever position is not less than the modified torque lever position and the difference between hop maximum pressure and hop minimum pressure is not greater than a predetermined amount, or when the actual torque control lever position is not less than the modified torque lever position, the difference between hop maximum pressure and hop minimum pressure is greater than the predetermined amount, and hop frequency is not greater than the predetermined frequency.

INDUSTRIAL APPLICABILITY

When in the all wheel drive mode, primarily the manual mode, the traction conditions can result in the front wheels hopping off the ground. The hopping condition causes loss of traction and in excess of twice the front axle weight upon impact. The hop stop method of the present invention assists the operator in controlling hop and, at the same time, reduces front axle loading. It monitors motor pressure and when it senses pressure fluctuations indicative of a hop, the all wheel drive system is stabilized. System stabilization is based upon pressure requirements for a given machine speed. Once the hop stabilization has started, it holds the all wheel drive motor pressure constant for 2 seconds. At the end of these 2 seconds, the motor pressure is set based upon a position of the torque control lever. If conditions still exist that lend to hopping, the controller will repeat the stabilization process again. When the controller counts three successive hops within 20 seconds, it will let the motor grader continue to hop until the operator pulls back the torque control lever. Once the torque control lever decrements, the counter is reset to zero and the procedure starts over. This allows the operator to fine tune the maximum amount of torque the underfoot conditions will handle by decrementing the torque control lever. Hopping will continue if the operator chooses not to pull the torque control lever back after the counter reaches three. If the hopping stops as a result of changes in the underfoot conditions, the counter will reset to zero. The counter is also reset to zero if the third hop set does not occur within 20 seconds. This keeps the counter logic the same with various conditions, for example, muddy spots, snow drifts, ice, etc.

The hop stop feature is a means for detecting and stabilizing pressure fluctuations in the all wheel drive motor. It is stabilized when pressure requirements for a given speed are met. It holds motor pressure constant for 2 seconds, then sets motor pressure based upon the position of the torque control lever. It senses front wheel pressure greater than about 8,000 kPa, looks for three ΔP's, uses radar speed, stabilizes pressure, and overrides torque control lever for 2 seconds.

As is evident from the foregoing description, certain aspects of the invention are not limited to the particular details of the examples illustrated, and it is therefore contemplated that other modifications and applications will occur to those skilled in the art. For example a different definition of a hop may be employed to fit a particular operating environment for a particular machine. It is accordingly intended that the claims shall cover all such modifications and applications as do not depart from the true spirit and scope of the invention.

What is claimed is:

1. A method for controlling slip in a machine having a pump for supplying pressurized fluid to first and second supplementary front wheel drive motors for effecting all wheel drive and having a torque control lever movable between positions of minimum and maximum lever travel for controlling pump pressure, said torque lever position being expressed as a percentage of maximum lever travel, said method comprising the steps of:

monitoring machine speed;

monitoring motor pressure;

searching for a first motor pressure fluctuation and subsequent motor pressure fluctuations indicative of a hop, where a hop is a pressure fluctuation characterized by a difference between a minimum pressure and a maximum pressure of at least a predetermined amount occurring within a predetermined cycle time;

determining desired pump pressure based upon machine speed; and overriding the torque control lever and holding pump pressure constant at desired pump pressure for a preselected time in response to detecting a predetermined number of hops occurring at a predetermined frequency.

2. A method, as set forth in claim 1, wherein said preselected time is 2 seconds.

3. A method, as set forth in claim 1, wherein said predetermined amount by which maximum pressure exceeds minimum pressure is more than 8,000 kPa.

4. A method, as set forth in claim 1, wherein said predetermined number of hops is three.

5. A method, as set forth in claim 1, wherein said predetermined frequency is 2 Hertz.

6. A method, as set forth in claim 1, wherein said predetermined frequency is in a range of 1 to 3 Hertz.

7. A method, as set forth in claim 1, including incrementing a hop counter each time said predetermined number of hops occurring at said predetermined frequency occurs, and recording a current torque control lever position minus a predetermined amount as a modified torque lever position.

8. A method, as set forth in claim 7, including repeating searching for said first pressure fluctuation and resetting said hop counter when the actual torque control lever position is less than said modified torque lever position.

9. A method, as set forth in claim 7, including repeating searching for said first pressure fluctuation and resetting said hop counter when the actual torque control lever position is not less than said modified torque lever position and the difference between maximum and minimum pressure fluctuation is not greater than 8,000 kPa.

10. A method, as set forth in claim 7, including repeating searching for said first pressure fluctuation and resetting said hop counter when the actual torque control lever position is not less than said modified torque lever position, the difference between maximum and minimum pressure fluctuation is greater than 8,000 kPa, and hop frequency is greater than 2 Hertz.

11. A method for controlling slip in a machine having a pump for supplying pressurized fluid to first and second supplementary front wheel drive motors for effecting all wheel drive and having a torque control lever movable between positions of minimum and maximum lever travel for controlling pump pressure, said torque lever position being expressed as a percentage of maximum lever travel, said method comprising the steps of:

monitoring ground speed of said machine;

monitoring motor pressure;

searching for a first set of n hops, where n is an integer greater than 2 and a hop is a fluctuation in wheel motor pressure characterized by a difference between a minimum pressure and a maximum pressure of at least a predetermined amount occurring within a predetermined cycle time;

determining whether a predetermined time has elapsed since said first set of n hops was detected;

restarting search for hop 1 if said predetermined time has elapsed since the first set of n hops was detected and resetting a hop counter;

searching for hop 1, if said predetermined time has not elapsed since the first set of n hops was detected, by locating a hop 1 minimum pressure and a hop 1 maximum pressure exceeding the minimum pressure by more than said predetermined amount;

restarting search for hop 1 if hop 1 maximum pressure does not exceed hop 1 minimum pressure by more than said predetermined amount, and resetting the hop counter;

after locating hop 1, searching for subsequent hops, including hop (n–1), hop (n) and hop (n+1) minimum pressure, when said predetermined time has not elapsed since the first set of n hops was detected;

incrementing the hop counter, when hop (n) maximum pressure exceeds hop (n+1) minimum pressure by more than said predetermined amount and hop (n) minimum pressure and hop (n+1) minimum pressure occur at a predetermined frequency;

after incrementing the hop counter, determining a desired pump pressure based upon machine ground speed when the hop counter counts less than 3 sets of hops, and overriding the torque control lever to hold the pump pressure constant at the desired pump pressure for a preselected time before resuming searching for a first hop;

recording a current torque control lever position, expressed as a percentage of torque control lever travel, minus a predetermined amount as a modified torque lever position when the hop counter counts 3 sets of hops, and continuing searching for hops;

resuming searching for hop 1 when the actual torque control lever position is less than said modified torque lever position, and resetting said hop counter;

resuming searching for hop 1 when the actual torque control lever position is not less than said modified torque lever position and the difference between hop maximum pressure and hop minimum pressure is not greater than a predetermined amount, and resetting the hop counter; and resuming searching for hop 1 and resetting the hop counter when the actual torque control lever position is not less than said modified torque lever position, the difference between hop maximum pressure and hop minimum pressure is greater than said predetermined amount, and hop frequency is not greater than said predetermined frequency.

12. A method, as set forth in claim 11, including:

searching for hop (n–1) minimum pressure after locating hop 1 when said predetermined time has not elapsed since the first set of n hops was located and determining whether hop 1 maximum pressure exceeds hop (n–1) minimum pressure by more than said predetermined amount;

restarting search for hop 1 if hop (n–2) maximum pressure does not exceed hop (n–1) minimum pressure by more than said predetermined amount, and resetting the hop counter; and restarting search for hop 1 if hop (n–2) maximum pressure exceeds hop (n–1) minimum pressure by more than said predetermined amount and a time lapse between hop 1 minimum pressure and hop (n–1) minimum pressure corresponds to a frequency less than said predetermined frequency, and resetting the hop counter.

13. A method, as set forth in claim 12, including:

searching for hop (n–1) maximum pressure, when hop (n–2) maximum pressure exceeds hop (n–1) minimum pressure by more than said predetermined amount and a time lapse between hop 1 minimum pressure and hop (n–1) minimum pressure corresponds to a frequency not less than said predetermined frequency, if said predetermined time has not elapsed since the first set of n hops was detected, and determining whether hop (n–1) maximum pressure exceeds hop (n–1) minimum pressure by more than said predetermined amount; and restarting search for hop 1 if hop (n–1) maximum pressure does not exceed hop (n–1) minimum pressure by more than said predetermined amount, and resetting the hop counter.

14. A method, as set forth in claim 11, including:

searching for hop (n) minimum pressure after locating hop (n–1) if said predetermined time has not elapsed since the first set of n hops was detected and determining whether hop (n–1) maximum pressure exceeds hop (n) minimum pressure by more than said predetermined amount;

restarting search for hop 1 if hop (n–1) maximum pressure does not exceed hop (n) minimum pressure by more than said predetermined amount, and resetting the hop counter; and restarting search for hop 1 if hop (n–1) maximum pressure exceeds hop (n) minimum pressure by more than said predetermined amount and a time lapse between hop (n–1) minimum pressure and hop (n) minimum pressure corresponds to a frequency less than said predetermined frequency, and resetting the hop counter.

15. A method, as set forth in claim 14, including:

searching for hop (n) maximum pressure, when hop (n–1) maximum pressure exceeds hop (n) minimum pressure by more than said predetermined amount and said time lapse between hop (n–1) minimum pressure and hop (n) minimum pressure corresponds to a frequency not less than said predetermined frequency, if said predetermined time has not elapsed since the first set of n hops was detected, and determining whether hop (n) maximum pressure exceeds hop (n) minimum pressure by more than said predetermined amount; and restarting search for hop 1 if hop (n) maximum pressure does not exceed hop (n) minimum pressure by more than said predetermined amount, and resetting the hop counter.

16. A method, as set forth in claim 11, including:

searching for hop (n+1) minimum pressure after locating hop (n) if said predetermined time has not elapsed since the first set of n hops was detected and determining whether hop (n) maximum pressure exceeds hop (n+1) minimum pressure by more than said predetermined amount;

restarting search for hop 1 if hop (n) maximum pressure does not exceed hop (n+1) minimum pressure by more than said predetermined amount, and resetting the hop counter; and restarting search for hop 1 if hop (n) maximum pressure exceeds hop (n+1) minimum pressure by more than a predetermined amount and a time lapse between hop (n) minimum pressure and hop (n+1) minimum pressure corresponds to a frequency less than said predetermined frequency, and resetting the hop counter.

17. A method for controlling slip in a machine having a current driven pump for supplying pressurized fluid to first and second supplementary from wheel drive motors for effecting all wheel drive and having a torque control lever movable between positions of minimum and maximum lever travel for controlling pump pressure, said torque lever position being expressed as a percentage of maximum lever travel, said method comprising the steps of:

monitoring ground speed of said machine;

monitoring motor pressure;

searching for a first set of 3 hops, where a hop is a fluctuation in wheel motor pressure characterized by a difference between a minimum pressure and a maximum pressure of at least 8,000 kPa occurring within a time interval not greater than 1 second;

determining whether 20 seconds has elapsed since said first set of 3 hops was detected;

restarting search for hop 1 if 20 seconds has elapsed since the first set of 3 hops was detected and resetting a hop counter;

searching for hop 1, if 20 seconds has not elapsed since the first set of 3 hops was detected, by locating said hop 1 minimum pressure and hop 1 maximum pressure exceeding the minimum pressure by more than 8,000 kPa;

restarting search for hop 1 if hop 1 maximum pressure does not exceed hop 1 minimum pressure by more than 8,000 kPa, and resetting the hop counter;

searching for hop 2 minimum pressure after locating hop 1 if 20 seconds has not elapsed since the first set of 3 hops was detected and determining whether hop 1 maximum pressure exceeds hop 2 minimum pressure by more than 8,000 kPa;

restarting search for hop 1 if hop 1 maximum pressure does not exceed hop 2 minimum pressure by more than 8,000 kPa, and resetting the hop counter;

restarting search for hop 1 if hop 1 maximum pressure exceeds hop 2 minimum pressure by more than 8,000 kPa and a time lapse greater than 0.5 seconds occurs between hop 1 minimum pressure and hop 2 minimum pressure, and resetting the hop counter;

searching for hop 2 maximum pressure, when hop 1 maximum pressure exceeds hop 2 minimum pressure by more than 8,000 kPa and a time lapse not greater than 0.5 seconds occurs between hop 1 minimum pressure and hop 2 minimum pressure, if 20 seconds has not elapsed since the first set of 3 hops was detected, and determining whether hop 2 maximum pressure exceeds hop 2 minimum pressure by more than 8,000 kPa;

restarting search for hop 1 if hop 2 maximum pressure does not exceed hop 2 minimum pressure by more than 8,000 kPa, and resetting the hop counter;

searching for hop 3 minimum pressure after hop 2 if 20 seconds has not elapsed since the first set of 3 hops was detected and determining whether hop 2 maximum pressure exceeds hop 3 minimum pressure by more than 8,000 kPa;

restarting search for hop 1 if hop 2 maximum pressure does not exceed hop 3 minimum pressure by more than 8,000 kPa, and resetting the hop counter;

restarting search for hop 1 if hop 2 maximum pressure exceeds hop 3 minimum pressure by more than 8,000 kPa and a time lapse greater than 0.5 seconds occurs between hop 2 minimum pressure and hop 3 minimum pressure, and resetting the hop counter;

searching for hop 3 maximum pressure, when hop 2 maximum pressure exceeds hop 3 minimum pressure by more than 8,000 kPa and a time lapse not greater than 0.5 seconds occurs between hop 2 minimum pressure and hop 3 minimum pressure, if 20 seconds has not elapsed since the first set of 3 hops was detected, and determining whether hop 3 maximum pressure exceeds hop 3 minimum pressure by more than 8,000 kPa;

restarting search for hop 1 if hop 3 maximum pressure does not exceed hop 3 minimum pressure by more than 8,000 kPa, and resetting the hop counter;

searching for hop 4 minimum pressure after locating hop 3 if 20 seconds has not elapsed since the first set of 3 hops was detected and determining whether hop 3 maximum pressure exceeds hop 4 minimum pressure by more than 8,000 kPa;

restarting search for hop 1 if hop 3 maximum pressure does not exceed hop 4 minimum pressure by more than 8,000 kPa, and resetting the hop counter;

restarting search for hop 1 if hop 3 maximum pressure exceeds hop 4 minimum pressure by more than 8,000 kPa and a time lapse greater than 0.5 seconds occurs between hop 3 minimum pressure and hop 4 minimum pressure, and resetting the hop counter;

incrementing the hop counter, when hop 3 maximum pressure exceeds hop 4 minimum pressure by more than 8,000 kPa and a time lapse not greater than 0.5 seconds occurs between hop 3 minimum pressure and hop 4 minimum pressure;

after incrementing the hop counter, determining a desired pump pressure based upon machine speed when the hop counter counts less than 3 sets of hops, and overriding the torque control lever to hold the pump pressure constant at the desired pump pressure for a preselected time before resuming searching for a first hop;

recording current torque control lever position minus a predetermined amount as modified torque lever position when the hop counter counts 3 sets of hops, and continuing searching for hops;

resuming searching for hop 1 when the actual torque control lever position is less than said modified torque lever position, and resetting said hop counter;

resuming searching for hop 1 when the actual torque control lever position is not less than said modified torque lever position and the difference between hop maximum pressure and hop minimum pressure is not greater than 8,000 kPa, and resetting the hop counter;

resuming searching for hop 1 when the actual torque control lever position is not less than said modified torque lever position, the difference between hop maximum pressure and hop minimum pressure is greater than 8,000 kPa, and hop frequency is greater than 2 Hertz, and a time lapse not greater than 0.5 seconds occurs between consecutive hop minimum pressures.

18. A slip hop control for an all wheel drive machine, said machine having a pump for supplying pressurized fluid to first and second supplementary front wheel drive motors for effecting all wheel drive, and having a torque control lever movable between positions of minimum and maximum lever travel for controlling pump pressure, said torque lever position being expressed as a percentage of maximum lever travel, and slip control comprising:

means for monitoring machine speed;

means for monitoring motor pressure;

means for searching for a first set of 3 hops, where a hop is a fluctuation in wheel motor pressure characterized by a difference between a minimum pressure and a maximum pressure of at least 8,000 kPa occurring within a time interval not greater than 1 second;

means for sensing a first motor pressure fluctuation and subsequent motor pressure fluctuations indicative of a hop;

means for determining desired pump pressure based upon machine speed; and means for overriding the torque control lever and holding pump pressure constant at desired pump pressure for a preselected time in response to detecting a predetermined number of hops occurring at a predetermined frequency.

19. A hop control, as set forth in claim 1, including:

means for incrementing a hop counter each time said predetermined number of hops occurring at said predetermined frequency occurs; and means for recording a current torque control lever position minus a predetermined amount as a modified torque lever position.

20. A hop control, as set forth in claim 18, wherein said predetermined frequency is in a range of 1 to 3 Hertz.

* * * * *

UNITED STATES PATENT AND TRADEMARK OFFICE
CERTIFICATE OF CORRECTION

PATENT NO.   : 5,474,147
DATED        : 12/12/95
INVENTOR(S)  : Leon P. Yesel; John P. Kitzerow It is certified that error appears in the above-identified patent and that said Letters Patent is hereby corrected as shown below:

In Claim 17, column 11, line 20, delete the word "from" and add --front--.

In Claim 18, column 13, line 17, delete the word "and" and add --said--.

Signed and Sealed this

Sixteenth Day of April, 1996

Attest:

BRUCE LEHMAN

*Attesting Officer*        *Commissioner of Patents and Trademarks*